Figure 1:
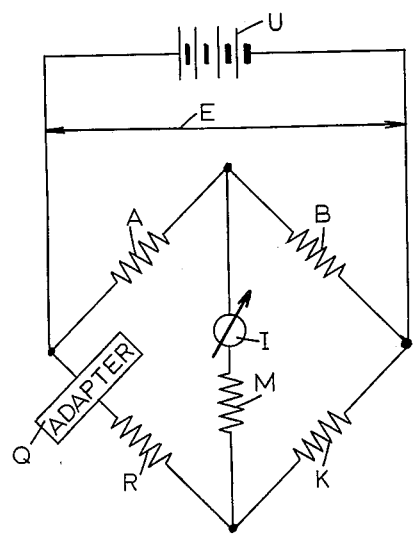

Sept. 24, 1963 G. WEISHEIT ETAL 3,104,550
RESISTANCE THERMOMETER
Filed Aug. 29, 1961

GEORG WEISHEIT
MARTIN BRAUN
INVENTORS.

BY Karl F. Ross

AGENT

United States Patent Office 3,104,550
Patented Sept. 24, 1963

3,104,550
RESISTANCE THERMOMETER
Georg Weisheit, Trappenbergstr. 37, Essen-Stadtwald, Germany, and Martin Braun, Gladbacher Str. 21, Cologne, Germany
Filed Aug. 29, 1961, Ser. No. 134,668
Claims priority, application Germany Aug. 31, 1960
4 Claims. (Cl. 73—362)

Our present invention relates to a resistance thermometer of the type having a temperature-sensitive impedance, such as a thermistor, connected in at least one of the arms of a Wheatstone bridge. A resistance thermometer of this type has been disclosed, for example, in U.S. Patent No. 2,971,379 issued February 14, 1961, to Georg Weisheit, one of the present applicants.

Known resistance thermometers, in which an ammeter or other current-measuring device is connected in one of the bridge diagonals, generally have a non-linear characteristic following an exponential law. This creates measuring difficulties since the associated scale cannot be optically read with the same exactitude in all parts of the measuring range. If the instrument is to be selectively switched to a plurality of measuring ranges, each range requires a separate scale to be mounted thereon.

The invention has for its general object the provision of an improved thermo-electrical instrument of the character set forth in which the aforestated disadvantages are avoided.

Another object of our invention is to provide a resistance thermometer so designed as to enable the measuring current to be maintained at or near an optimum value for the intended purpose.

It is also an object of this invention to provide an instrument of this type in which the temperature-sensitive element, such as the aforementioned thermistor, can be readily replaced when need therefore arises.

In accordance with this invention we provide a resistance thermometer in which the resistances of the bridge arms are so proportioned that, at the extremities of a predetermined measuring range, currents of substantially equal absolute magnitudes pass through the bridge diagonal containing the meter while at the mid-point of the range the bridge is in balance. A plurality of different ranges, all centered on the same balancing temperature, may be established in like manner.

We have found that a system so proportioned, surprisingly enough, operates substantially linearly within the usual measuring ranges which may extend from 20° C. to 40° or 50° C. for medical purposes and from near 0° C. to several hundred degrees in industrial applications. This linearization enables the use of a single scale for a plurality of measuring ranges (which may be multiples of one another) without the addition of extra parts in comparison with conventional systems.

Figure 2:
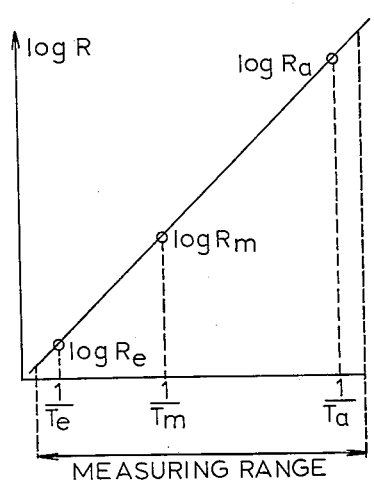
Figure 3:
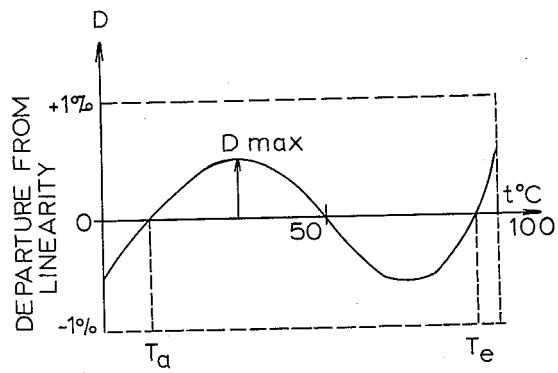

Although the magnitudes of the resistances required to satisfy the aforestated conditions can readily be determined experimentally in each instance, there will be described hereinafter a method of establishing their relative values mathematically. Reference in this connection will be made to the accompanying drawing in which:

FIG. 1 is a circuit diagram of a resistance thermometer according to the invention;
FIG. 2 is a graph showing the resistance-temperature relationship of a thermistor used in the system of FIG. 1; and
FIG. 3 is a graph illustrating the degree of linearization of the bridge current realized with a system according to the invention.

The instrument shown in FIG. 1 comprises a Wheatstone bridge whose arms are formed by three fixed resistances A, B, K and a variable, temperature-sensitive resistance element represented by a thermistor R. An adapter Q may be inserted, as shown, in series with the thermistor for the purpose of compensating for manufacturing tolerances of the latter. The adapter Q may be simply an adjustable resistor, as illustrated in the aforementioned Weisheit patent. The resistance of this adapter will not be considered hereinafter separately from that of the thermistor R.

Connected across one diagonal of the bridge is a source of current, here shown schematically as a battery U delivering an input voltage E. The other diagonal includes an ammeter I whose resistance, together with that of any other element (e.g. a calibrating resistor) in that diagonal, is symbolized by an element M.

If the source U is of low internal resistance, or if means are provided to compensate the variable voltage drop thereacross, the input voltage E may be regarded as constant. The current $i$ passing through the output diagonal, which deflects a pointer (not shown) on a suitably calibrated temperature scale associated with the ammeter I, is given by the relationship $$i = \frac{E(RB - KA)}{(A+B)[RK + M(R+K)] + AB(R+K)} \quad (1)$$

The resistance R of the thermistor, assumed to have a negative temperature coefficient of resistance, is a function of temperature T according to the formula $$\log R = \frac{a}{T} + b \quad (2)$$

where $a$ and $b$ are constants, this function being a straight line as plotted in the graph of FIG. 2 which gives the values of log R on its ordinate and the reciprocal of temperature $1/T$ on its abscissa.

With a measuring range bounded substantially by the limiting temperatures $T_a$ and $T_e$ whose arithmetic means is $T_m$, the corresponding values of the thermistor resistance are designated $R_a$, $R_e$ and $R_m$. If, now, the magnitudes of the bridge resistances A, B and K are so chosen in accordance with the invention that the currents flowing through meter I at temperatures $T_a$ and $T_e$ are of the same absolute magnitude, then the output current $i$ can be expressed by the equation $$i = \frac{E}{F} \cdot \frac{R - R_m}{R + C} \quad (3)$$

wherein $$C = \frac{R_m(R_a + R_e) - 2 R_a R_e}{R_a + R_e - 2 R_m} \quad (4)$$

and $$F = \frac{R_m^2}{R_m - nC}\left(1 + \frac{1}{n}\right) \quad (5)$$

$n$ being a constant which in the general case may be freely chosen which C and F have the dimensions of resistances.

The relationship between the bridge resistances A, B, K and M is as follows:

$$A = (n+1)\left(\frac{CR_m}{R_m - nC} - M\right) \quad (6)$$

$$B = \frac{A}{n} \quad (7)$$

$$K = \frac{R_m}{n} \quad (8)$$

The following subsidiary conditions should, accordingly, be satisfied:

$$R_m > nC \qquad (9)$$

$$\frac{CR_m}{R_m - nC} > M \qquad (10)$$

and $$\frac{1}{R_a} + \frac{1}{R_e} > \frac{1}{R_m} \qquad (11)$$

the relationships 9 and 10 calling merely for a suitable selection of $n$ while relationship 11 is realizable if the characteristic of the thermistor (or equivalent thermoresistive device) is properly chosen with due regard to the desired measuring range.

It can further be shown that optimum sensitivity, i.e. maximum current increments over the measuring range with insignificant departure from linearity of the scale, is obtainable if the optimum value of $n$, designated $n_{opt}$, is selected so that $$n_{opt} = \sqrt{\frac{R_m}{C} + 1} - 1 \qquad (12)$$

this relationship being in most cases compatible with the requirements of inequality 10.

In a multirange instrument it is possible to produce identical output currents $i$ with equivalent measuring temperatures, i.e. temperatures occupying similar positions in different measuring ranges, by suitably modifying the value of $n$ through adjustment and/or replacement of some or all of the bridge resistances, e.g. by means similar to those shown in the aforementioned U.S. Patent No. 2,971,379. Let, for a second (e.g. wider) temperature range, the parameters $i$, $R$, $F$ and $C$ assume the values $i'$, $R'$, $F'$ and $C'$, respectively, so that $$i' = \frac{E}{F'} \cdot \frac{R' - R_m}{R' + C'} \qquad (3')$$

(E and $R_m$ remaining unchanged). The magnitude of $C'$ is computed from Equation 4 by substitution of the new thermistor resistances $R_a'$, $R_e'$ for $R_a$ and $R_e$. If, now, $i = i'$ for values of $R$ and $R'$ relating to equivalent temperatures, $F'$ can be determined from Equations 3 and 3'; $R$ and $R'$ could be replaced, for example, by $R_a$ and $R_a'$. Next, on the basis of Equation 5, the constant $n'$ can be determined from the formula $$n' = \frac{R_m}{2F'C'}\left(\sqrt{(F' - R_m)^2 - 4F'C'} + F' - R_m\right) \qquad (13)$$

It is thus possible to make $n = n_{opt}$ as per Equation 12, for one measuring range (preferably the narrowest one) and to set $n = n'$, in accordance with Equation 13, for every other range.

It should be understood that the two limiting temperatures $T_a$ and $T_e$ need not be the actual extremes of a range but may advantageously be shifted toward the center of the range, e.g. by 5% to 10% of the extent of the range, in order to afford even closer approximation of perfect linearity; cf. FIGS. 2 and 3.

The departure from linearity decreases with a reduction in the spread of the measuring range expressed in terms of $1/T$. Thus, with certain thermistors having a negative temperature coefficient of resistance, the peaks $D_{max}$ of the non-linear deviation, designated D in FIG. 3, are less than ±0.6% (i.e. ±0.6°) in a range of 100° to 200° C. but less than ±0.2% (i.e. ±0.2°) in a range of 200° to 300° C. The peak values $D_{max}$, the positive one of which occurs at approximately 40% of the range as shown in FIG. 3, can be expressed with good approximation by the relationship $$D_{max} = \left[\frac{(R_z - R_m)(R_a - R_e)}{(R_z + C)(R_a + R_e - 2R_m)} - \frac{1}{2}\right] \qquad (14)$$

wherein $R_z$ is the thermistor resistance at a temperature $$T_z = \frac{T_a + T_m}{2} \qquad (15)$$

The maximum output current $i_{max}$ is given by the formula $$i_{max} = \frac{E}{F} \cdot \frac{R_{max} - R_m}{R_{max} + C} \qquad (16)$$

wherein $R_{max}$ represents the thermistor resistance at either extreme of the range.

The presence of the adapter Q enables the characteristic of the thermistor to be shifted, though maintained linear in the graph of FIG. 2, in order to allow the use of standard-size resistances for all bridge arms except, at most, one.

We claim:

1. A resistance thermometer comprising a bridge circuit with four resistance arms including a thermosensitive resistance element in at least one of said arms, said bridge circuit having an input diagonal connectable across a voltage source and an output diagonal including current-responsive temperature-indicating means, the resistances of said arms being so chosen that the currents passing through said output diagonal are of substantially the same absolute value on opposite ends of the operating range of said temperature-indicating means, the resistances A, B, K of three of said arms, the resistance M of said output diagonal, the resistances $R_a$, $R_e$ of said thermosensitive resistance element at opposite ends of said range and the resistance $R_m$ of said thermosensitive resistance element at the midpoint of said range substantially satisfying the relationships $$A = (n+1)\left(\frac{CR_m}{R_m - nC} - M\right)$$

$$B = \frac{A}{n}$$

$$K = \frac{R_m}{n}$$

wherein $$C = \frac{R_m(R_a + R_e) - 2R_aR_e}{R_a + R_e - 2R_m}$$

$n$ being a constant.

2. A resistance thermometer according to claim 1 wherein the value of $n$ is given substantially by the equation $$n = \sqrt{\frac{R_m}{C} + 1} - 1$$

3. A resistance thermometer according to claim 1 wherein said thermosensitive resistance element comprises a thermistor with negative temperature coefficient of resistance.

4. A resistance thermometer according to claim 3, further comprising supplemental resistance means in series with said thermistor.

References Cited in the file of this patent

UNITED STATES PATENTS

| | | |
|---|---|---|
| 2,547,625 | Corson | Apr. 3, 1951 |
| 2,753,714 | Perkins et al. | July 10, 1956 |
| 2,971,379 | Weisheit | Feb. 14, 1961 |